United States Patent
Florencio et al.

(10) Patent No.: US 9,602,923 B2
(45) Date of Patent: Mar. 21, 2017

(54) ESTIMATING A ROOM IMPULSE RESPONSE

(71) Applicant: Microsoft Corporation, Redmond, WA (US)

(72) Inventors: Dinei Florencio, Redmond, WA (US); Atulya Yellepeddi, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 14/098,283

(22) Filed: Dec. 5, 2013

(65) Prior Publication Data

US 2015/0163593 A1    Jun. 11, 2015

(51) Int. Cl.
| | |
|---|---|
| G06F 17/00 | (2006.01) |
| H04R 3/00 | (2006.01) |
| G10K 11/16 | (2006.01) |
| H04S 7/00 | (2006.01) |
| H04M 3/00 | (2006.01) |
| H04M 9/08 | (2006.01) |

(52) U.S. Cl.
CPC ............ *H04R 3/005* (2013.01); *G10K 11/16* (2013.01); *H04R 3/002* (2013.01); *H04S 7/305* (2013.01); *H04M 3/002* (2013.01); *H04M 9/082* (2013.01); *H04R 2227/007* (2013.01)

(58) Field of Classification Search
USPC .................. 700/94; 381/74, 58, 59; 341/155
See application file for complete search history.

(56) References Cited

U.S. PATENT DOCUMENTS

| | | | |
|---|---|---|---|
| 6,404,886 B1 | 6/2002 | Yoshida et al. | |
| 6,563,925 B1 | 5/2003 | Krasny | |
| 7,003,099 B1 | 2/2006 | Zhang et al. | |
| 7,035,398 B2 | 4/2006 | Matsuo | |
| 7,831,035 B2 | 11/2010 | Stokes et al. | |
| 8,184,801 B1 | 5/2012 | Hamalainen | |
| 2004/0062403 A1* | 4/2004 | Gay ................... | H03H 21/0043 381/71.11 |
| 2006/0147063 A1 | 7/2006 | Chen | |
| 2007/0280472 A1 | 12/2007 | Stokes, III et al. | |
| 2008/0107281 A1 | 5/2008 | Togami et al. | |

(Continued)

FOREIGN PATENT DOCUMENTS

EP    719028 A2    6/1996

OTHER PUBLICATIONS

"Second Written Opinion Issued in PCT Application No. PCT/US2014/067803", Mailed Date: Oct. 15, 2015, 5 Pages.

(Continued)

*Primary Examiner* — Simon Sing
*Assistant Examiner* — Eugene Zhao
(74) *Attorney, Agent, or Firm* — International IP Law Group, PLLC

(57) ABSTRACT

Various methods and systems for estimating a room impulse response between an audio source and an array of microphones are described. In one example, a method includes receiving audio signals at a microphone of an array of microphones. The audio signals correspond to each of the microphones in the array of microphones. The method also includes determining a room impulse response in a subspace that is compatible with a geometry of the array of microphones based on the received audio signals.

21 Claims, 7 Drawing Sheets

(56) References Cited

U.S. PATENT DOCUMENTS

| | | | |
|---|---|---|---|
| 2010/0272274 A1* | 10/2010 | Fozunbal | H04M 9/085 381/71.1 |
| 2010/0278351 A1 | 11/2010 | Fozunbal et al. | |
| 2011/0311064 A1* | 12/2011 | Teutsch | 381/26 |
| 2011/0317522 A1* | 12/2011 | Florencio | G01S 3/8006 367/129 |
| 2013/0096922 A1* | 4/2013 | Asaei | G01S 3/8006 704/270 |

OTHER PUBLICATIONS

"International Search Report and Written Opinion Issued in PCT Patent Application No. PCT/US2014/067803", Mailed Date: Feb. 19, 2015, 13 Pages.

Affes et al., "A Source Subspace Tracking Array of Microphones for Double Talk Situations", In IEEE International Conference on Acoustics, Speech, and Signal Processing, vol. 2, May 7, 1996, 4 pages.

Allen et al., "Image Method for Efficiently Simulating Small-Room Acoustics", In Journal of the Acoustical Society of America, vol. 65, Apr. 1979, 8 pages, Murray Hill, New Jersey, USA.

Benesty et al., "A Multichannel Affine Projection Algorithm with Applications to Multichannel Acoustic Echo Cancellation", In IEEE Signal Processing Letters, vol. 3, Issue 2, Feb. 1996, 3 pages.

Benesty et al., "An Improved PNLMS Algorithm", In IEEE International Conference on Acoustics, Speech, and Signal Processing, vol. 2, May 13, 2002, 4 pages, Murray Hill, New Jersey, USA.

Berg et al., "Probing the Pareto Frontier for Basis Pursuit Solutions", In SIAM Journal on Scientific Computing, vol. 31, No. 2, Oct. 29, 2013, 23 pages.

Breining et al., "Acoustic Echo Control: An Application of Very-High-Order Adaptive Filters", In IEEE Signal Processing Magazine, vol. 16, Issue 4, Jul. 7, 28 pages.

Buchner, et al., "Acoustic Echo Cancellation for Two and More Reproduction Channels", In 7th International Workshop on Acoustic Echo and Noise Control, Sep. 10, 2001, 4 pages, Erlangen, Germany.

Chhetri et al., "Acoustic Echo Cancelation for High Noise Environments", In IEEE International Conference on Multimedia and Expo, Jul. 9, 2006, 4 pages, Tempe, Arizona, USA.

Donoho et al., "Stable Recovery of Sparse Overcomplete Representations in the Presence of Noise", In IEEE Transactions on Information Theory, vol. 52, Issue 1, Jan. 2006, 42 pages.

Duttweiler, Donald L., "Proportionate Normalized Least-Mean-Squares Adaptation in Echo Cancelers", In IEEE Transactions on Speech and Audio Processing, vol. 8, Issue 5, Sep. 2000, 11 pages.

Hansler, Eberhard, "The Hands-Free Telephone Problem—An Annotated Bibliography", In Signal Processing, vol. 27, Issue 3, Jun. 1992, 5 pages, Darmstadt, Germany.

Makino, et al., "Exponentially Weighted Stepsize NLMS Adaptive Filter Based on the Statistics of a Room Impulse Response", In IEEE Transactions on Speech and Audio Processing, vol. 1, Issue 1, Jan. 1993, 8 pages.

Maruo et al., "Statistical Analysis of the Jointly-Optimized Acoustic Echo Cancellation BF-AEC Structure", IEEE International Conference on Acoustics, Speech and Signal Processing, May 26, 21013, 5 pages, Florinopolis, Brazil.

Mattias, "Acoustic Noise and Echo Cancelling with Microphone Array", In IEEE Transactions on Vehicular Technology, Sep. 1999, 9 pages.

Microsoft Corporation, "XBox, Listen: Driving Gameplay with Kinect Audio Input and Speech Recognition", Jun. 8, 2011, Available at: http://www.microsoft.com/en-us/download/details.aspx?id=26102.

Mignot et al., "Room Reverberation Reconstruction: Interpolation of the Early Part Using Compressed Sensing", In IEEE Transactions on Audio, Speech, and Language Processing, vol. 21, Issue 11, Jul. 17, 2013, 12 pages.

Moonen et al., "A Multi-Core Architecture for in-Car Digital Entertainment", In Proceedings of GSPx Conference, Oct. 24, 2005, 6 pages.

Ribeiro et al., "Geometrically Constrained Room Modeling with Compact Microphone Arrays", In IEEE Transactions on Audio, Speech, and Language Processing, vol. 20, Issue 5, Jul. 2012, 12 pages.

Turin, George L., "An Introduction to Matched Filters", In IRE Transactions on Information Theory, vol. 6, Issue 3, Jun. 1960, 19 pages.

Gustafsson, et al., "Estimation of Acoustical Room Transfer Functions", In the Proceedings of the 39th IEEE Conference on Decision and Control, vol. 5, Dec. 12, 2000, pp. 5184-5189.

"International Preliminary Report on Patentability Issued in PCT Application No. PCT/US2014/067803", Mailed Date: Mar. 11, 2016, 6 Pages.

* cited by examiner

300

400

ESTIMATING A ROOM IMPULSE RESPONSE

BACKGROUND

Acoustic echo cancellation (AEC) is the problem of eliminating, from the signal captured by a microphone, the signals radiated by loudspeakers that are placed in proximity to the microphone. AEC has been an important aspect of bi-directional communication, including teleconferencing systems, speaker phones, and the like. The standard problem scenario includes one loudspeaker and one microphone, and the traditional solution is to train an adaptive filter to remove the indication of loudspeaker feedback. Due to the importance of the problem, increasing convergence speed, detecting convergence state, reducing computational complexity, etc. are areas where research continues to advance.

A second scenario has recently gained importance, namely, voice control for home and automobile entertainment systems. These systems usually have multichannel audio reproduction, e.g., stereo or 5.1 surround systems, operating at fairly high reproduction levels. The user (i.e., the desired sound source) may be several meters away from the microphone, and noise levels can be significant.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for estimating a room impulse response between an audio source and an array of microphones. The method includes receiving audio signals at a microphone of an array of microphones, the audio signals corresponding to each of the microphones. The method also includes determining a room impulse response in a subspace that is compatible with a geometry of the array of microphones based on the received audio signals.

Another embodiment provides a method for estimating a room impulse response between an audio source and microphone array. The method includes receiving audio signals at a microphone of an array of microphones, the audio signals corresponding to each of the microphones. The method also includes defining a set of single-source signals as the single-source signals would impinge on all microphones of the array of microphones at the same time, each of the single-source signals corresponding to a different location a single real or virtual source. Furthermore, the method includes finding an approximation of the received audio signal as a weighted combination of the set of single-source signals. The method includes estimating a room impulse response from the audio source to each of the microphones of the array of microphones, the impulse response corresponding to the weighted combination. The method concludes by canceling acoustic echo from the received audio signal using the impulse response.

Another embodiment provides a system for implementing acoustic echo cancellation of audible feedback experienced in an arrangement of an audio source and microphone array. The system includes a processor to execute processor executable code, an array of microphones, and a storage device that stores processor executable code. When the processor executable code is executed by the system processor and causes the processor to receive audio signals at a microphone of the array of microphones, the audio signals corresponding to each of the microphones. The processor is configured to define a set of single-source signals as the single-source signals would impinge on all microphones of the array of microphones at the same time, each of the single-source signals corresponding to a different location a single real or virtual source. The processor is caused to find an approximation of the received audio signal as a weighted combination of the set of single-source signals. The processor is configured to estimate a room impulse response from the audio source to each of the microphones of the array of microphones, the impulse response corresponding to the weighted combination. The processor finally is caused to cancel acoustic echo from the received audio signal using the impulse response.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
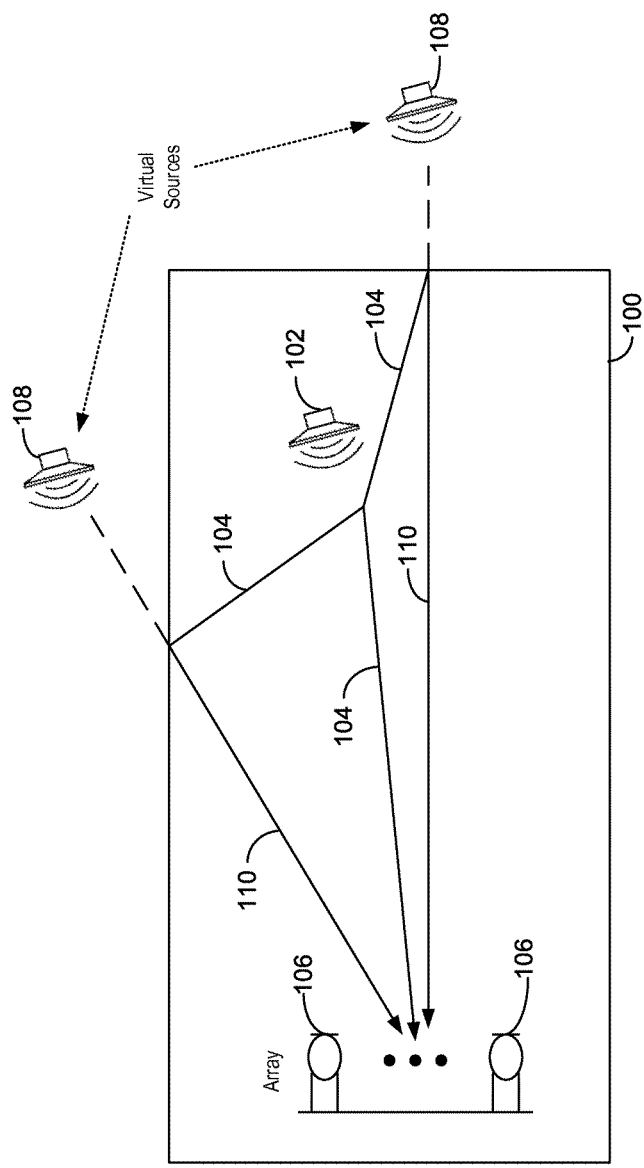
FIG. 1 is a schematic of a room where audible signal reflections are modeled as virtual image sources.

The problem of acoustic echo cancellation in a reverberant environment with a microphone array and one or more loudspeakers is considered. Cancelling echo requires learning the impulse response from a number of loudspeakers to each microphone in the array of microphones. This has conventionally been done separately at each microphone for each loudspeaker. However, the signals arriving at the array share a common structure, which can be exploited to improve the impulse response estimates.

Embodiments presented herein are targeted at the initial room transfer function (RTF) estimation, based on a calibration signal. The techniques described herein can be extended to the more complex problem of adaptive AEC filters, however most currently deployed microphone arrays use a calibration signal to initialize the filters, and later adapt a subset of the filter coefficients. Present embodiments are directed toward, but not limited to, the more relevant problem of the initial RTF estimation. Sparseness of the RTF is well known, and has been used in echo cancellation. See J. Benesty, et al. "Adaptive algorithms for the identification of sparse impulse responses," *Selected methods for acoustic*

*echo and noise control*, vol. 5, pp. 125-153, 2006. The interaction between beamforming (or spatial filtering) and echo cancellation has also been considered. See W. Herbordt, et al. "Joint optimization of acoustic echo cancellation and adaptive beamforming," *Topics in acoustic echo and noise control*, pp. 19-50, 2006. However, in those cases the echo cancellation filter estimation does not itself take advantage of the array information. Previous techniques compute each AEC filter separately and do not exploit the array structure as detailed in the current disclosure.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Embodiments of the techniques described herein are directed toward, but not limited to, room transfer function estimation. The present embodiments consider incorporating array information into the estimate of the echo cancellation filters to achieve the desired result of acoustic echo cancellation.

FIG. 1 is a schematic of a room 100 where audible signal reflections 110 are modeled as virtual image sources 108. Loudspeaker 102 emits sound waves 104 in all directions that reverberate within the room 100, reflecting off walls and other surfaces before being received at the microphone array 106. Each reflection 110 corresponds to an image source 108 that is used in examples described herein to simulate acoustics within the room 100. The received signal at the microphone array 106 is the superposition of the signal received along a number of paths between the loudspeaker 102 transmitting the signal and the receiver at the microphone array 106.

An embodiment of the current technique incorporates an algorithm that takes advantage of the microphone array structure 106, as well as the sparsity of the reflections 110 arriving at the array, in order to form estimates of the impulse response between each loudspeaker 102 and microphone 106. The algorithm is shown to improve performance over a matched filter algorithm on both synthetic and real data. An embodiment uses known microphone array geometry to improve the room transfer function (RTF) estimate at each microphone. This is achieved by exploiting regularities that appear in the RTFs, owing to the fact that all the microphones are in the same room, receiving signals from the same loudspeakers and bouncing off the same obstacles. While we assume the microphone array geometry is known, it should be noted that the geometry of the microphone arrays 106 does not need to be known in advance of collecting the signals described herein. In other words, it is not necessary to know the configuration of the array beforehand, as this can be estimated using the received signals. A person familiar with the art will know how to use correlation and multiple received signals to estimate array geometry.

Figure 2:
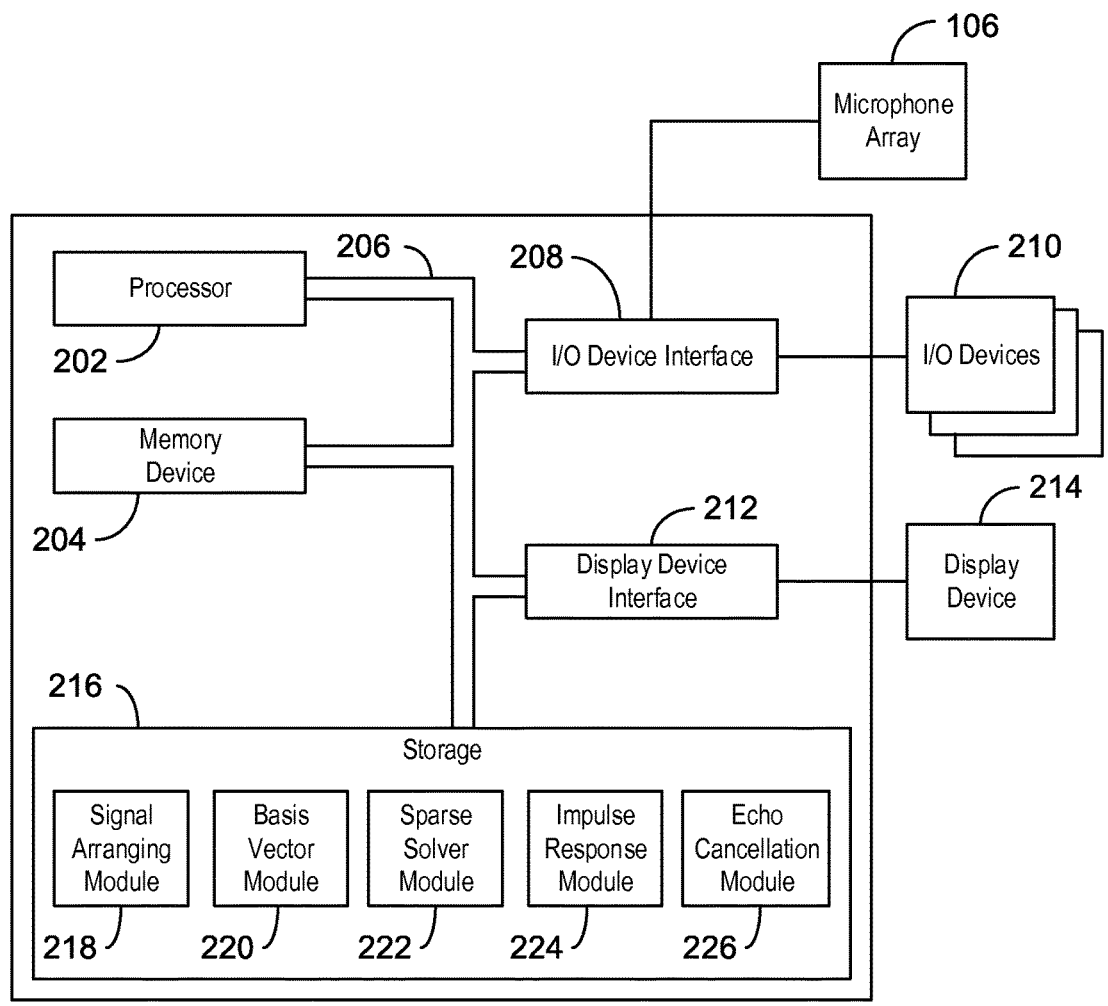
FIG. 2 is a block diagram of an example of a computing device that can be used for AEC using sparse array signal processing.

FIG. 2 is a block diagram of an example of a computing device 200 that can be used for AEC using sparse array signal processing. The computing system 200 can be, for example, the Xbox Kinect® used in conjunction with the Xbox 360® or Xbox One® platform by Microsoft®, or similar audio capture devices. In some embodiments, the computing system 200 may be a desktop computer, for example, used by a reviewer to provide feedback. In another embodiment, the computing system 200 can be incorporated within the dashboard display and user interface in many newer automobiles. The computing system 200 can include a processor 202 that is adapted to execute stored instructions, as well as a memory device 204 that stores instructions that are executable by the processor 202. The processor 202 can be a single core processor, a multi-core processor, a computing cluster, or any number of other configurations. The memory device 204 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 202 can be used for acoustic echo cancellation using signal processing based on sparsely represented arrays.

The processor 202 may be connected through a system bus 206 (e.g., a proprietary bus, PCI, ISA, PCI-Express, HyperTransport®, NuBus, etc.) to an input/output (I/O) device interface 208 adapted to connect the computing system 200 to one or more I/O devices 210. The I/O devices 210 can include, for example, a camera, a gesture recognition input device, a keyboard, a pointing device, a voice recognition device, and a network interface, among others. The pointing device may include a touchpad or a touchscreen, among others. In the current disclosure, an important I/O device is the microphone array 106 that is connected to the computing system 200. The I/O devices 210 can be built-in components of the computing system 200, or can be devices that are externally connected to the computing system 200.

The processor 202 can also be linked through the system bus 206 to a display device interface 212 adapted to connect the computing system 200 to a display device 214. The display device 214 may include a display screen that is a built-in component of the computing system 200. The display device 214 can also include a computer monitor, television, or projector, among others, that is externally connected to the computing system 200.

Storage 216 can be coupled to the processor 202 through the bus 206. The storage 216 can include a hard drive, a solid state drive, an optical drive, a USB flash drive, an array of drives, or any combinations thereof. The storage 216 can include a number of modules configured to implement acoustic echo cancellation using sparse array signal processing as described herein. For example, the storage 216 can include a signal arranging module 218 configured to arrange the received signals 110 at all of the microphones of the microphone array 106 into a single large vector.

The storage 216 can further include a basis vector module 220 for calculating a basis vector that incorporates a source distance from and angle of a received signal to the microphone array 106. For each possible angle and each possible delay time, which can be calculated as a distance, a basis vector can be defined as the loudspeaker signal if it had been arriving from a specific angle and delay to the center of the array, stacked up for each microphone of the array of microphones 106. In an embodiment, all possible angles and delays are discretized and subjected to a sparse solver before an impulse response can be generated that cancels the acoustic echo experienced at the microphone array 106. Thus, the received signal becomes a weighted combination of a few of the basis vectors (a few because the possible number of angles and delays is much larger than those actually received at the microphone array 106).

Also included in storage 106 can be a sparse solver module 222. Because there are millions of angles and delays, and since each of them needs to be represented by a basis vector, the total size of the basis matrix is huge. Each possible location is to be represented, whether those signals represented by the basis vector are real or virtual. Through a convex optimization procedure, the sparse solver module 222 uses weighted basis vectors and determines weights of a minimum value that satisfy a particular reconstruction error. The optimization procedure can be, for example, Basis Pursuit Denoising (BPDN), a well-known method to solve the problem of approximate representation of with sparse constraints. The sparse solver can also include such solvers as the SPGL solver, a Matlab™ solver for large-scale one-norm regularized least squares, which relies on matrix-vector operations.

An impulse response module 224 can also be included in storage 216. The impulse response module 224 is configured to utilize the basis weights determined from the sparse solver module 222 and estimate the impulse response from the loudspeaker 102 to each of the microphones of the array of microphones 106. An impulse response can be estimated using a basis vector that corresponds to the basis vector that is calculated by the basis vector module 220. A corresponding basis matrix can also be configured by the impulse response module 224, and a vector from this basis matrix can contain the impulse response estimates stacked up in order of each microphone in the array of microphones 106. The storage 216 can furthermore include an echo cancellation module 226 that uses the impulse response estimates to cancel out the acoustic echo received at the array of microphones 106. The echo cancellation module 226 filters the received signals at each microphone and solves the AEC problem.

It is to be understood that the block diagram of FIG. 2 is not intended to indicate that the computing system 200 is to include all of the components shown in FIG. 2. Rather, the computing system 200 can include fewer or additional components not illustrated in FIG. 2, e.g., additional applications, additional modules, additional memory devices, additional network interfaces (not shown), and the like. Further, the computing system 200 is not limited to the modules shown as any combinations of the code used to implement these functions can be implemented.

Figure 3:
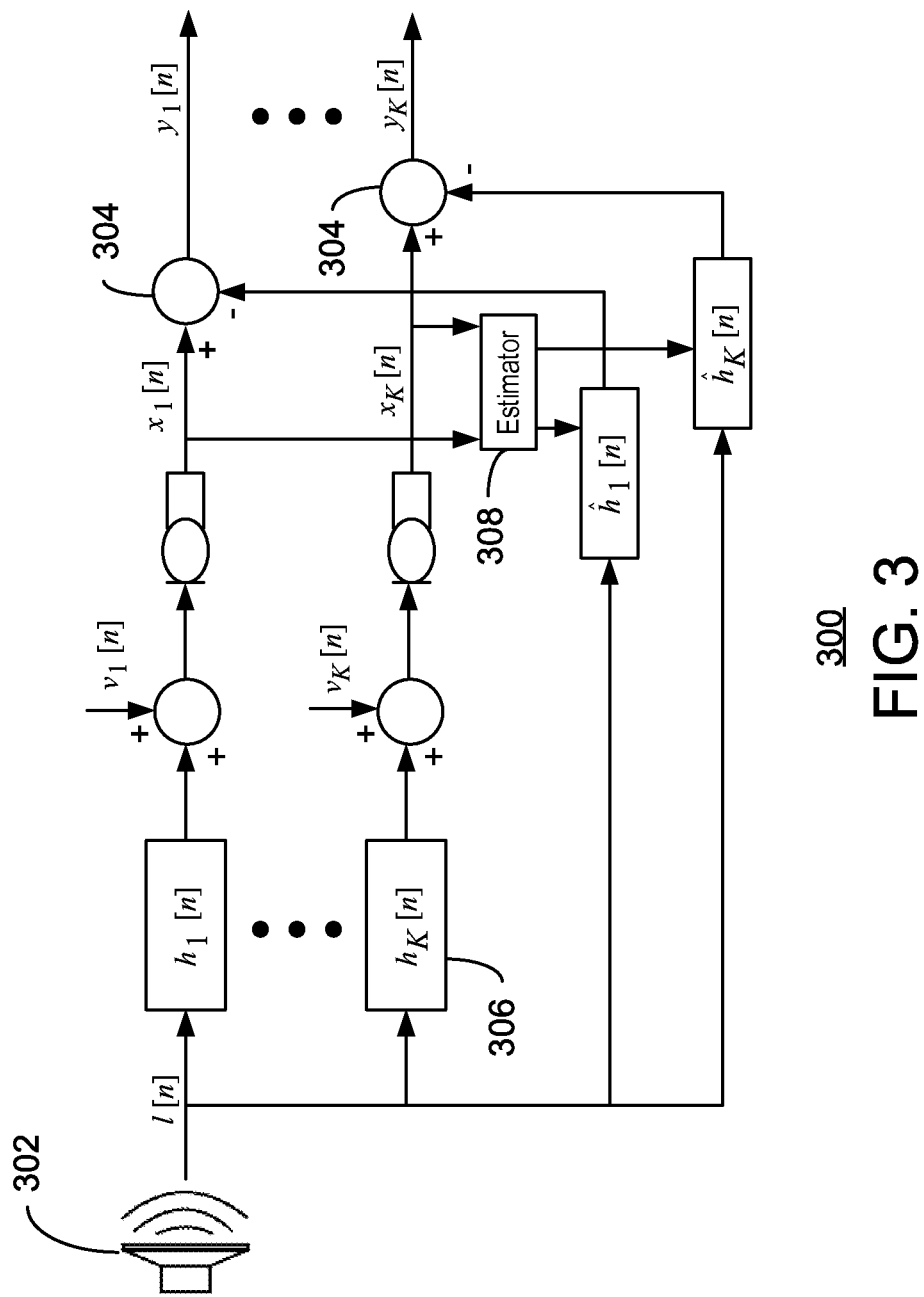
FIG. 3 represents a system model of the microphone array and loudspeaker configuration.

FIG. 3 represents a system model of the microphone array and loudspeaker configuration. During a calibration phase, a training signal l(t) is played at the loudspeaker 302. We use a discrete-time notation, and use n as our time index. We thus denote the discrete-time version of l(t) as l[n]. An exemplary embodiment utilizes multiple loudspeakers, and this procedure may have to be repeated for each loudspeaker separately. The RTF from the loudspeaker 302 to the $k^{th}$ microphone 304 is denoted as $h_k[n]$ 306, and is assumed to be time invariant, but adaptation can be performed to track time-varying features. Thus, the signal received at microphone k 304 is denoted by Equation (1):

$$x_k[n] = \sum_{m=0}^{N-1} h_k[m]l[n-m] + d_k[n] + v_k[n] \tag{1}$$

In Equation (1), m is a dummy variable used to compute the summation, $d_k[n]$ is the desired signal, n is the traditional notation for the time index, and $v_k[n]$ is the interfering noise. Note that $d_k[n]$ is assumed to be zero during the calibration phase. If the RTFs $h_k[n]$ 306 were known, echo could simply be subtracted from the received signal. Instead, cancellation filters $\hat{h}_k[n]$, are approximations that are computed and that are used to (partially) remove the echo from $x_k[n]$ by computing an output signal $y_k[n]$ given by:

$$y_k[n] = x_k[n] - \sum_{m=0}^{N-1} \hat{h}_k[m]l[n-m] \tag{2}$$

In Equation (2), like variables are the same as those defined in Equation (1).

When only one microphone and one loudspeaker are present, the minimum mean square error estimate of the RTF is known as the "matched filter," which can be computed as:

$$h_k^{MF}[n] = \frac{\sum_m \tilde{l}[m]\tilde{x}_k[n+m]}{\sum_m (\tilde{l}[m])^2} \quad (3)$$

In Equation (3), $\tilde{l}[n]$ refers to the whitened version of $l[n]$, and $\tilde{x}_k[n]$ refers to $x_k[n]$ after it is filtered by the same filter used to whiten the loudspeaker signal, $l[n]$. A statistical whitening procedure beneficially transforms the data so they have an identity covariance matrix, wherein all samples are statistically independent. The cancellation filter of Equation (3) is the baseline calculation against which the current echo cancellation technique is compared. Furthermore, an estimate of each RTF obtained at the estimator 308 by exploiting the multiple microphones in the array of microphones can be better than the above optimum.

Figure 4:
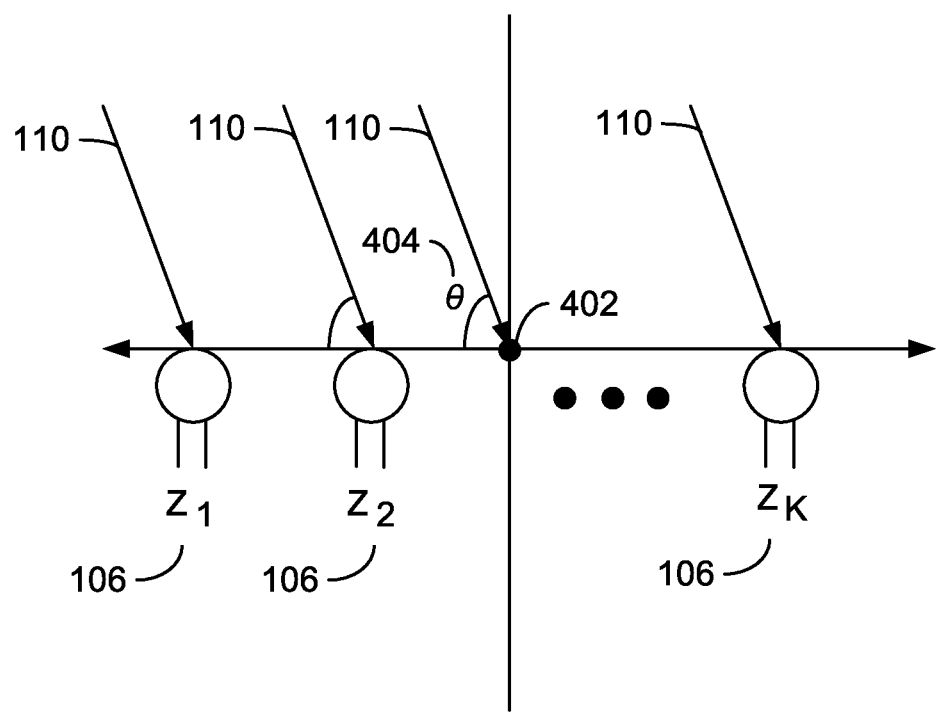
FIG. 4 is a schematic of the audible signals arriving at a planar, 1-d array.

FIG. 4 is a schematic of the audible signals arriving at a planar array 400. Along any one path, the signal has a propagation delay to the center of the array, which depends on the length of the path, and a (possibly frequency-dependent) gain, which depends on the nature of the reflections 110 taken. Assuming the reflection 110 arrives at the array 106 as a plane wave, the structure of the received signal along a particular path is indicated in FIG. 4. For simplicity of notation, assume a linear array of microphones, and that the microphones are aligned along the z axis, as in FIG. 4, and located at positions $(z_1, z_2, \ldots, z_K)$ 106. For the plane wave impinging upon the linear array 106, if the continuous time signal at the origin 402 is s(t), then the signal at a microphone located at $z_k$ is $s(t-\tau(z_k, \theta))$, where $\tau(z_k, \theta) = -z_k \cos(\theta)/c$, and c is the speed of sound. In other words, the signal produced at each microphone 106 by the plane wave is the same, except for a delay (τ) which depends only on the array geometry and the direction of arrival (θ) 404.

Each reflection 110 can correspond to a virtual image source 108 as indicated in FIG. 1. Equation (4), below, assumes first that the dimensions of the array 106 are small enough that the wavefronts can be approximated as planar, assumes further that every reflector is flat-fading, and finally assumes P number of sources (real or image) are sufficient to provide an approximation of the arriving signal. Then under these assumptions, the signal received at microphone k of the array of microphones 106 can be written as:

$$x_k[n] = \sum_{p=1}^{P} \alpha_p l\left(nT_s - T_p - \frac{z_k}{c}\cos\theta_p\right) + \tilde{v}_k[n] \quad (4)$$

In Equation (4), $T_p$ and $\alpha_p$ are, respectively, the delay and attenuation suffered by wavefront p (including propagation loss and microphone and loudspeaker directivities). Furthermore, c is the speed of sound, $\tilde{v}_k[n]$ includes both the actual noise $v_k[n]$ and possibly any unmodeled signal components, and $\theta_p$ is the angle made by the signal arriving along the $p^{th}$ path with the axis of the array. $T_s$ is the sampling interval, and $z_k$ is the position of the k-th microphone in the z-axis as defined before. A set of single-source signals can be defined as single-source signals that would impinge on all microphones of the array of microphones at the same time, each of the single-source signals corresponding to a different location a single real or virtual source.

Equation (4) and FIG. 4 assume that the array of microphones 106 is uniform and linearly aligned. However, this configuration provides only an example and is not required to implement the current disclosure. Indeed, the array need not be linear in general. Furthermore, Equation (4) implicitly assumed that the gain is frequency independent, which is also not required, but is assumed in the implementation of the techniques described herein.

Figure 5:
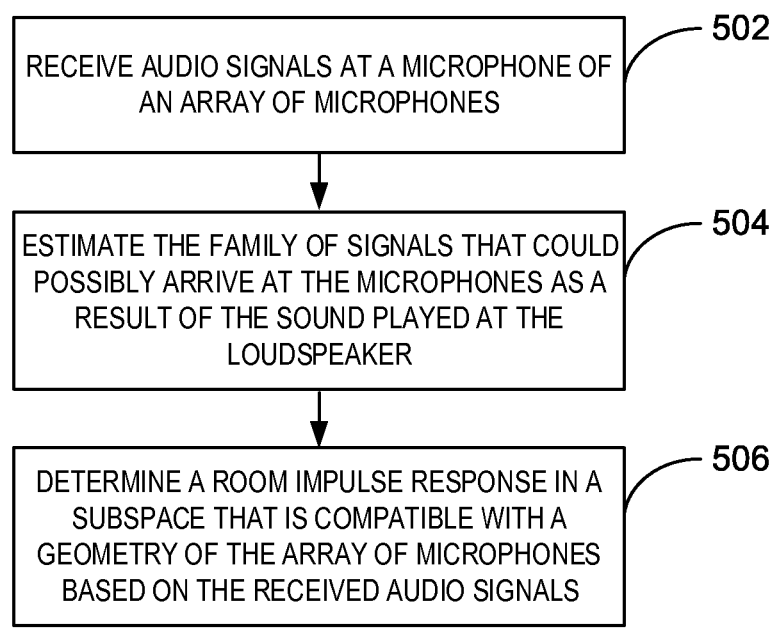
FIG. 5 is a process flow diagram of an example method for receiving audio signals and estimating an impulse response.

FIG. 5 is a process flow diagram of an example method for receiving audio signals and estimating an impulse response. The method 500 starts at block 502 when an audio signal is played at one or more loudspeakers, and a corresponding signal is received at a microphone of an array of microphones, possibly contaminated by ambient noise. The method includes a step at block 504 where the family of signals that could possibly arrive at the microphones as a result of the sound played at the loudspeaker is estimated. The method also includes a determination at block 506 of a room impulse response in a subspace that is compatible with a geometry of the array of microphones based on the received audio signals.

The process flow diagram of FIG. 5 is not intended to indicate that the steps of the method 500 are to be executed in any particular order, or that all of the steps of the method 500 are to be included in every case. Further, any number of additional steps may be included within the method 500, depending on the specific application.

Figure 6:
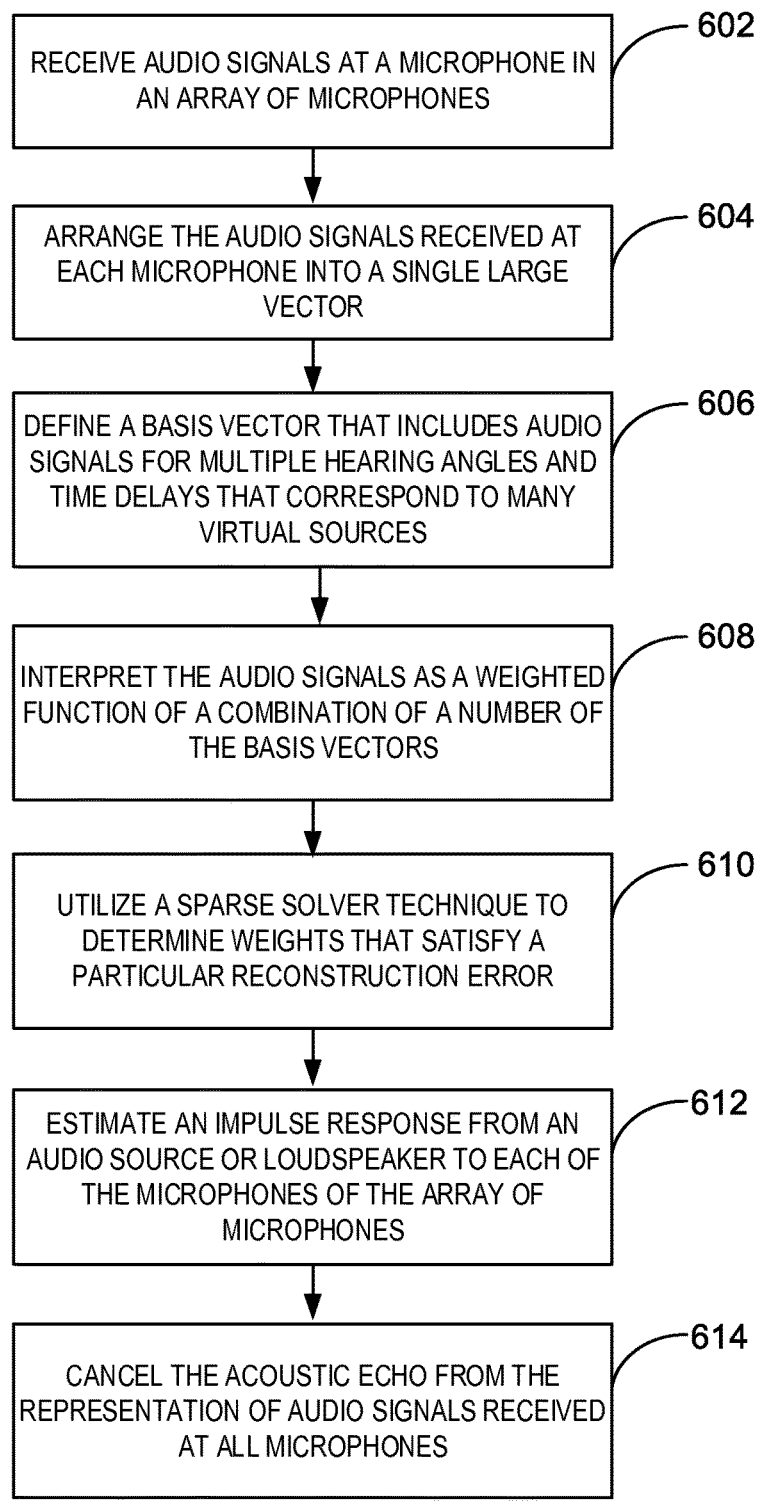
FIG. 6 is a process flow diagram of an example method for cancelling acoustic echo using sparse array signal processing.

FIG. 6 is a process flow diagram of an example of a method 500 for implementing acoustic echo cancellation using sparse array signal processing. The method may be implemented by the computing device 200 described with respect to FIG. 2. The method 600 begins at block 602 where the audio signals are received at the microphone array. The received signals are then arranged at block 604 and represented as a single, large mathematical vector. At block 606, a basis vector is defined to include a signal sent by a loudspeaker for multiple hearing angles and time delays that correspond to many virtual sources. The virtual sources or image sources can be representations of the vast number of possible signal reflections that may reverberate within a room before being received at the microphone array. Not all of the possible vectors will thus be analyzed, and a weighted construction can be imposed to provide a more readily computable data set.

The method thus continues at block 608 where the received audio signals, whether virtual or real, are interpreted as a weighted function of a combination of a number of the basis vectors. The basis vectors and corresponding weights can be optimized to result in the best representation of the observed vector in some desired echo space. The optimization can be modeled through the following:

$$\hat{w} = \underset{w}{\mathrm{argmin}} \|w\|_1, \text{ s.t. } \|Bw - x\|_2 \le \sigma. \quad (5)$$

In Equation (5), $\hat{w}$ is the computed best weight vector (i.e., the vector that minimizes the expression in (5)), B is a large matrix describing the desired echo space, and formed by composing all the individual basis vectors; x is the observed vector; and σ is the allowed reconstruction error. In an exemplary embodiment, σ is set to a value slightly larger than the standard deviation of the unmodeled components. More specifically, while any value of σ will produce results, in this example, σ is set to σ=βσ_v for some β>1, where σ_v is the noise standard deviation, and β is a positive integer. In another embodiment, β can be set to 1.5.

Because of the large amount of data that can represent the audible signals, the matrix B is likely to be huge, and likely to constitute an overcomplete basis of the signal space. Thus, it becomes necessary to find efficient ways of solving (5), as well as finding efficient ways of handling the overcompleteness. This can be done by imposing a sparsity constraint (imbedded in the norm-1 metric indicated in (5)), and using a sparse solver. This allows the data in B to be stored and more easily accessed. At block 610, a sparse solver is utilized to determine weights that satisfy a particular reconstruction error. As indicated, this reconstruction error can ideally be slightly larger than the standard deviation of unmodeled components. The reconstruction error can be, for example, a figure close to a modeling error plus noise. A cleanup procedure can also be implemented to further improve performance. The cleanup re-computes all coefficients $w_{\theta,t}$ found in (5) to be non-zero (or above a certain threshold), by minimizing the value of $|x-\Sigma_{\theta,t}w_{\theta,t}b_{\theta,t}|_2$. Wherein $b_{\theta,t}$ is the basis vector corresponding to a reflection arriving at angle θ with delay t, and $w_{\theta,t}$ is the weight associated with that basis vector (and that has been found as non-zero in (5)).

At block 612, an impulse response is estimated from the loudspeaker to each of the microphones of the array of microphones. The impulse response corresponds to an estimate for the acoustic echo generated by the loudspeaker and is effectively used to cancel out such echo when it is received at the microphone array. The impulse response estimate can be computed as, for example, the following vector:

$$\tilde{h} = \sum_{\theta,t} \tilde{w}_{\theta,t} h_{\theta,x} \quad (6)$$

At block 614, the impulse response estimate vector of Equation (6) can be used to cancel the acoustic echo from the representation of audio signals received at all microphones of the array of microphones.

The process flow diagram of FIG. 6 is not intended to indicate that the steps of the method 600 are to be executed in any particular order, or that all of the steps of the method 600 are to be included in every case. Further, any number of additional steps may be included within the method 600, depending on the specific application.

Figure 7:
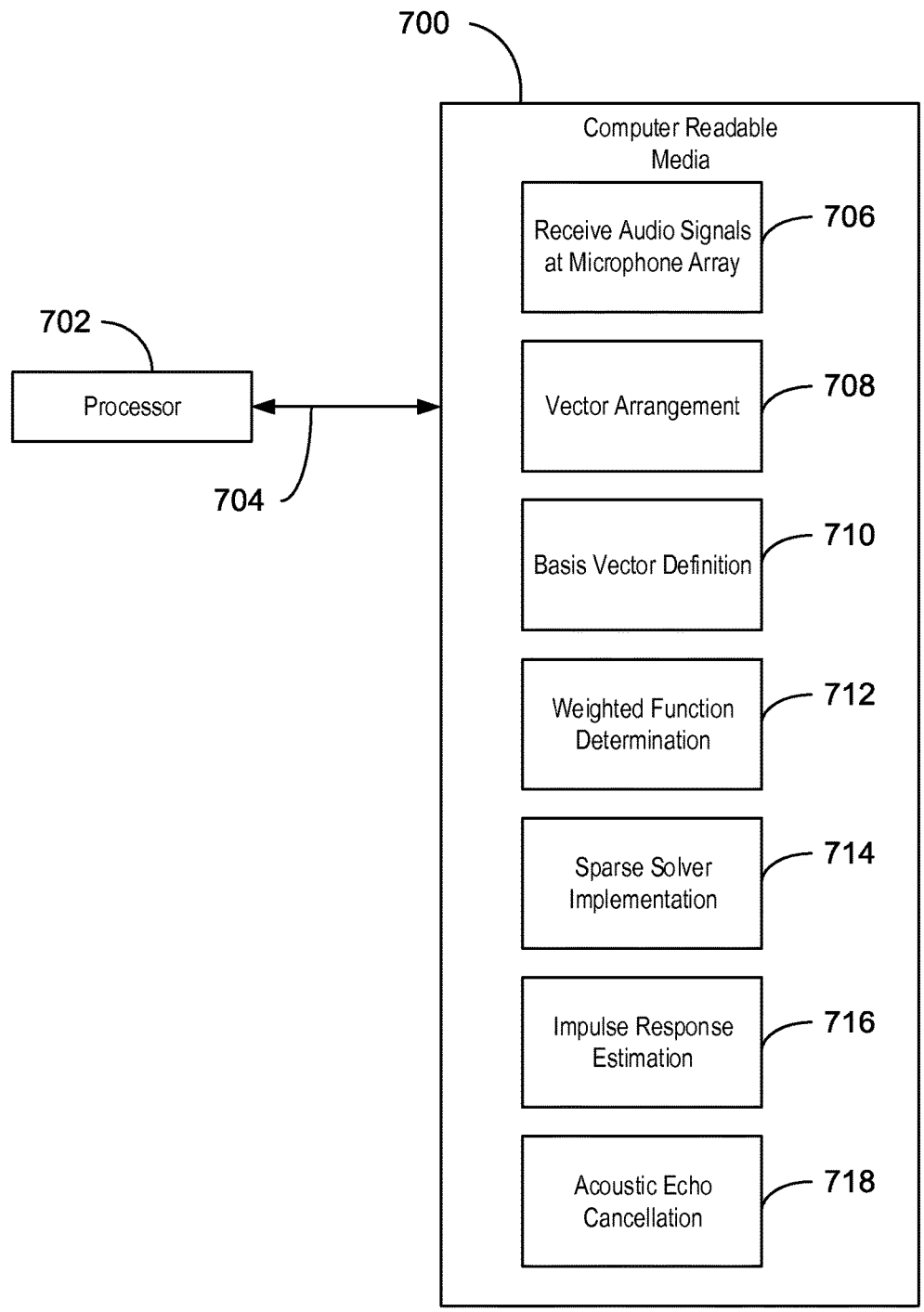
FIG. 7 is a block diagram showing a tangible, computer-readable storage media that can store instructions for cancelling acoustic echo using sparse array signal processing.

FIG. 7 is a block diagram showing a tangible, computer-readable storage media 700 that can be used for executing AEC using sparse array signal processing. The tangible, computer-readable storage media 700 may be accessed by a processor 702 over a computer bus 704. Furthermore, the tangible, computer-readable storage media 700 may include code to direct the processor 702 to perform the steps of the techniques disclosed herein.

The tangible, computer-readable storage media 700 can include code 706 configured to direct the processor 702 to receive and process audio signals arriving at a microphone array. Further, the tangible, computer-readable storage media 700 can include code 708 configured to direct the processor 702 to facilitate vector arrangement. For example, the code may instruct the processor 702 to define one single large vector of possible representations of the received audio signal. Another block of code 710 can instruct the processor to define a basis vector that can be a combination of virtual and real source signals. A block of code 712 can then instruct the processor 702 to create a weighted function over the values of the basis vector, in order to reduce the amount of representative data to a more manageable size. The tangible, computer-readable storage media 700 can also include code 714 to instruct the processor 702 to implement a sparse solver technique to impose a sparsity constraint on the still very large amount of data defined by the weighted basis vector. The block of code at 716 can then direct the processor 702 to calculate impulse response estimations at each microphone of the array of microphones. The impulse response estimations can then be utilized through block of code 718 to cancel the acoustic echo that is typically generated in audio systems having microphones that register delayed reflected audio signals.

It is to be understood that any number of additional software components not shown in FIG. 7 may be included within the tangible, computer-readable storage media 700, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

What is claimed is:

1. A method for estimating a room impulse response between an audio source and an array of microphones, comprising:
receiving audio signals at a microphone of an array of microphones, the audio signals corresponding to each of the microphones;
estimating a geometry of the array of microphones; and
determining a room impulse response in a subspace based on the estimated geometry of the array of microphones and the received audio signals, the received audio signals to be modeled based in part on a basis vector comprising a sampling interval, a propagation delay from the audio source to a center of the array of microphones, a channel length, an individual microphone from the array of microphones, and an angle of arrival from the received audio signals.

2. The method of claim 1, comprising defining a set of single-source signals as the single-source signals would impinge on all microphones of the array of microphones at the same time, each of the single-source signals corresponding to a different location a single real or virtual source.

3. The method of claim 1, comprising using the room impulse response to initialize an acoustic echo cancelation.

4. The method of claim 1, comprising creating an approximation of the received audio signals as a weighted combination of the set of single-source signals.

5. The method of claim 4, comprising using a sparse solver to determine a weight that satisfies a reconstruction error.

6. The method of claim 5, wherein the weight is optimized utilizing convex optimization techniques.

7. The method of claim 5, wherein the reconstruction error corresponds to modeling error plus noise.

8. The method of claim 1, comprising calculating an impulse response in a subspace that is compatible with a microphone array geometry.

9. The method of claim 1, wherein the received audio signals are represented by basis vectors; wherein the basis vectors are configured to represent real or virtual image signals that would be received by the microphone array from an unattenuated source.

10. The method of claim 1, wherein the structure of the received signal is modeled by the following basis vector:

$$b_{T,\theta} = \begin{bmatrix} l(0 - T - \tau(z_1, \theta)) \\ \vdots \\ l((L_x - 1)T_s - T - \tau(z_1, \theta)) \\ \vdots \\ l(0 - T - \tau(z_K, \theta)) \\ \vdots \\ l((L_x - 1)T_s - T - \tau(z_K, \theta)) \end{bmatrix};$$

wherein l(t) is a function of the continuous time version of the audio source signal; $L_x$ denotes the length of the received calibration signal at each microphone; $T_s$ is the sampling interval; T is the propagation delay from the source to the center of the array of microphones; τ is a function of $z_k$ and θ; where $z_k$ is an individual microphone of the array of microphones; and θ is the angle of arrival from the received signal.

11. The method of claim 1, wherein the impulse response is estimated using techniques that rely on the fast Fourier transform algorithm.

12. The method of claim 1, wherein the impulse response is modeled by the following vector:

$$h_{T,\theta} = \begin{bmatrix} \mathrm{sinc}\left(0 - \frac{T + \tau(z_1, \theta)}{T_s}\right) \\ \vdots \\ \mathrm{sinc}\left(N - 1 - \frac{T + \tau(z_1, \theta)}{T_s}\right) \\ \vdots \\ \mathrm{sinc}\left(0 - \frac{T + \tau(z_K, \theta)}{T_s}\right) \\ \vdots \\ \mathrm{sinc}\left(N - 1 - \frac{T + \tau(z_K, \theta)}{T_s}\right) \end{bmatrix};$$

wherein $T_s$ is the sampling interval; T is the propagation delay from the source to the center of the array of microphones; N denotes the channel length; τ is a function of $z_k$ and θ; where $z_k$ is the individual microphone of the array of microphones; and θ is the angle of arrival from the received signal.

13. The method of claim 1, wherein the received audio signals are represented by basis vectors; wherein the basis vectors are configured to represent real or virtual image signals that would be received by the microphone array from an unattenuated source; and wherein the basis vectors are combined to form a matrix that is to be solved based on a sparsity constraint.

14. A method for estimating a room impulse response between an audio source and microphone array, comprising:
receiving audio signals at a microphone of an array of microphones, the audio signals corresponding to each of the microphones;
estimating a geometry of the array of microphones;
defining a set of single-source signals, the single-source signals to impinge on each of the microphones of the array of microphones at the same time, each of the single-source signals corresponding to a different location of a real or virtual source;
finding an approximation of the received audio signal as a weighted combination of the set of single-source signals;
estimating a room impulse response from the audio source to each of the microphones of the array of microphones, the impulse response corresponding to the weighted combination and the room impulse response being based at least in part on the geometry of the array of microphones, and a basis vector comprising a sampling interval, a propagation delay from the audio source to a center of the array of microphones, a channel length, an individual microphone from the array of microphones, and an angle of arrival from the received audio signals; and
canceling acoustic echo from the received audio signal using the impulse response.

15. The method of claim 14, wherein the structure of the received audio signal is modeled by the following basis vector:

$$b_{T,\theta} = \begin{bmatrix} l(0 - T - \tau(z_1, \theta)) \\ \vdots \\ l((L_x - 1)T_s - T - \tau(z_1, \theta)) \\ \vdots \\ l(0 - T - \tau(z_K, \theta)) \\ \vdots \\ l((L_x - 1)T_s - T - \tau(z_K, \theta)) \end{bmatrix};$$

wherein l(t) is a function of the continuous time version of the audio source signal; $L_x$ denotes the length of the received calibration signal at each microphone; $T_s$ is the sampling interval; T is the propagation delay from the source to the center of the array of microphones; τ is a function of $z_k$ and θ; where $z_k$ is an individual microphone of the array of microphones; and θ is the angle of arrival from the received signal.

16. The method of claim 14, wherein the impulse response is modeled by the following vector:

$$h_{T,\theta} = \begin{bmatrix} \mathrm{sinc}\left(0 - \frac{T + \tau(z_1, \theta)}{T_s}\right) \\ \vdots \\ \mathrm{sinc}\left(N - 1 - \frac{T + \tau(z_1, \theta)}{T_s}\right) \\ \vdots \\ \mathrm{sinc}\left(0 - \frac{T + \tau(z_K, \theta)}{T_s}\right) \\ \vdots \\ \mathrm{sinc}\left(N - 1 - \frac{T + \tau(z_K, \theta)}{T_s}\right) \end{bmatrix};$$

wherein $T_s$ is the sampling interval; T is the propagation delay from the source to the center of the array of microphones; N denotes the channel length; τ is a function of $z_k$ and θ; where $z_k$ is the individual microphone of the array of microphones; and θ is the angle of arrival from the received signal.

17. A system for implementing acoustic echo cancellation of audible feedback experienced in an arrangement of an audio source and microphone array, comprising:

a processor to execute processor executable code;

an array of microphones; and a storage device that stores processor executable code, wherein the processor executable code, when executed by the processor, causes the processor to:

receive audio signals at a microphone of an array of microphones, the audio signals corresponding to each of the microphones;

estimate a geometry of the array of microphones;

define a set of single-source signals as the single-source signals would impinge on all microphones of the array of microphones at the same time, each of the single-source signals corresponding to a different location a single real or virtual source;

find an approximation of the received audio signal as a weighted combination of the set of single-source signals;

estimate a room impulse response from the audio source to each of the microphones of the array of microphones, the impulse response corresponding to the weighted combination and the room impulse response to be based at least in part on the geometry of the array of microphones, and a basis vector comprising a sampling interval, a propagation delay from the audio source to a center of the array of microphones, a channel length, an individual microphone from the array of microphones, and an angle of arrival from the received audio signals; and cancel acoustic echo from the received audio signal using the impulse response.

18. The system of claim 17, wherein the weighted combination of the set of single-source signals is optimized utilizing convex optimization techniques.

19. The system of claim 17, wherein the impulse response is estimated using techniques that rely on the fast Fourier transform algorithm.

20. The system of claim 17, wherein the structure of the received audio signal is modeled by the following basis vector:

$$b_{T,\theta} = \begin{bmatrix} l(0 - T - \tau(z_1, \theta)) \\ \vdots \\ l((L_x - 1)T_s - T - \tau(z_1, \theta)) \\ \vdots \\ l(0 - T - \tau(z_K, \theta)) \\ \vdots \\ l((L_x - 1)T_s - T - \tau(z_K, \theta)) \end{bmatrix};$$

wherein l(t) is a function of the continuous time version of the audio source signal; $L_x$ denotes the length of the received calibration signal at each microphone; $T_s$ is the sampling interval; T is the propagation delay from the source to the center of the array of microphones; τ is a function of $z_k$ and θ; where $z_k$ is an individual microphone of the array of microphones; and θ is the angle of arrival from the received signal.

21. The system of claim 17, wherein the impulse response is modeled by the following vector:

$$h_{T,\theta} = \begin{bmatrix} \text{sinc}\left(0 - \frac{T + \tau(z_1, \theta)}{T_s}\right) \\ \vdots \\ \text{sinc}\left(N - 1 - \frac{T + \tau(z_1, \theta)}{T_s}\right) \\ \vdots \\ \text{sinc}\left(0 - \frac{T + \tau(z_K, \theta)}{T_s}\right) \\ \vdots \\ \text{sinc}\left(N - 1 - \frac{T + \tau(z_K, \theta)}{T_s}\right) \end{bmatrix};$$

wherein $T_s$ is the sampling interval; T is the propagation delay from the source to the center of the array of microphones; N denotes the channel length; τ is a function of $z_k$ and θ; where $z_k$ is the individual microphone of the array of microphones; and θ is the angle of arrival from the received signal.

* * * * *